United States Patent [19]
Ankenman et al.

[11] 3,990,521
[45] Nov. 9, 1976

[54] FOLDABLE FARM IMPLEMENT WITH TRAILING WING OSCILLATION RESTRICTOR

[75] Inventors: Thomas W. Ankenman, Tipton; Nelson J. Palen, Beloit, both of Kans.

[73] Assignee: Kent Manufacturing Co., Inc., Tipton, Kans.

[22] Filed: Feb. 24, 1975

[21] Appl. No.: 552,444

[52] U.S. Cl.............................. 172/311; 172/456; 267/19 A
[51] Int. Cl.²....................................... A01B 15/14
[58] Field of Search................. 172/311, 456, 776; 280/411 R, 411 A, 412, 413, 699; 16/133, 158, 159, 162, 181, 187; 267/19 A

[56] References Cited
UNITED STATES PATENTS

| | | | |
|---|---|---|---|
| 2,062,012 | 11/1936 | Opolo | 267/19 A |
| 3,542,138 | 11/1970 | Fackler et al. | 172/776 |
| 3,841,412 | 10/1974 | Sosalla | 172/311 |
| 3,880,241 | 4/1975 | Vincent | 172/311 |

FOREIGN PATENTS OR APPLICATIONS

| | | | |
|---|---|---|---|
| 512,848 | 6/1931 | Germany | 280/699 |

*Primary Examiner*—Richard T. Stouffer
*Attorney, Agent, or Firm*—Fishburn, Gold & Litman

[57] ABSTRACT

An improved farm implement of the sectional tow type including a central section and wing sections hingedly connected to the central section. Each section is mounted on wheels for transport and the sections are comprised of a plurality of hingedly connected frames to allow uniform ground coverage on coarse terrain. The wing sections are connected to the central section for movement therewith between a vertical transport position and a horizontal cultivating position. A spring loaded oscillation restriction mechanism including oppositely loaded leaf springs is provided between each wing section frame and operates to reduce oscillation when towed in the transport position.

10 Claims, 4 Drawing Figures

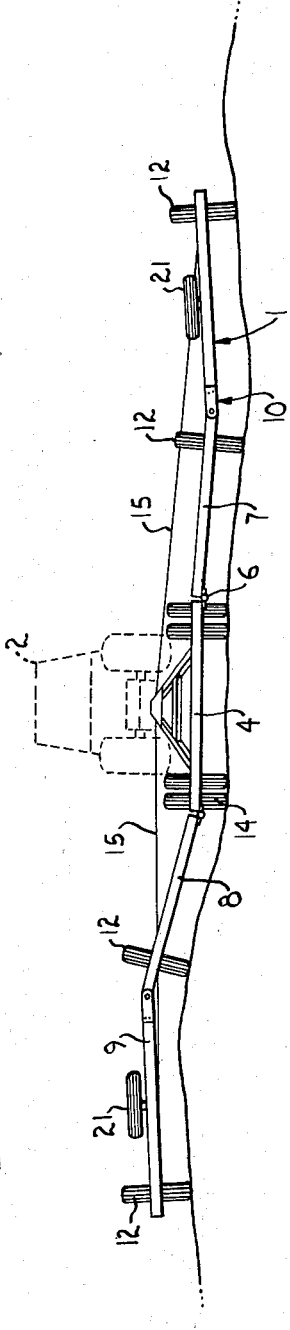
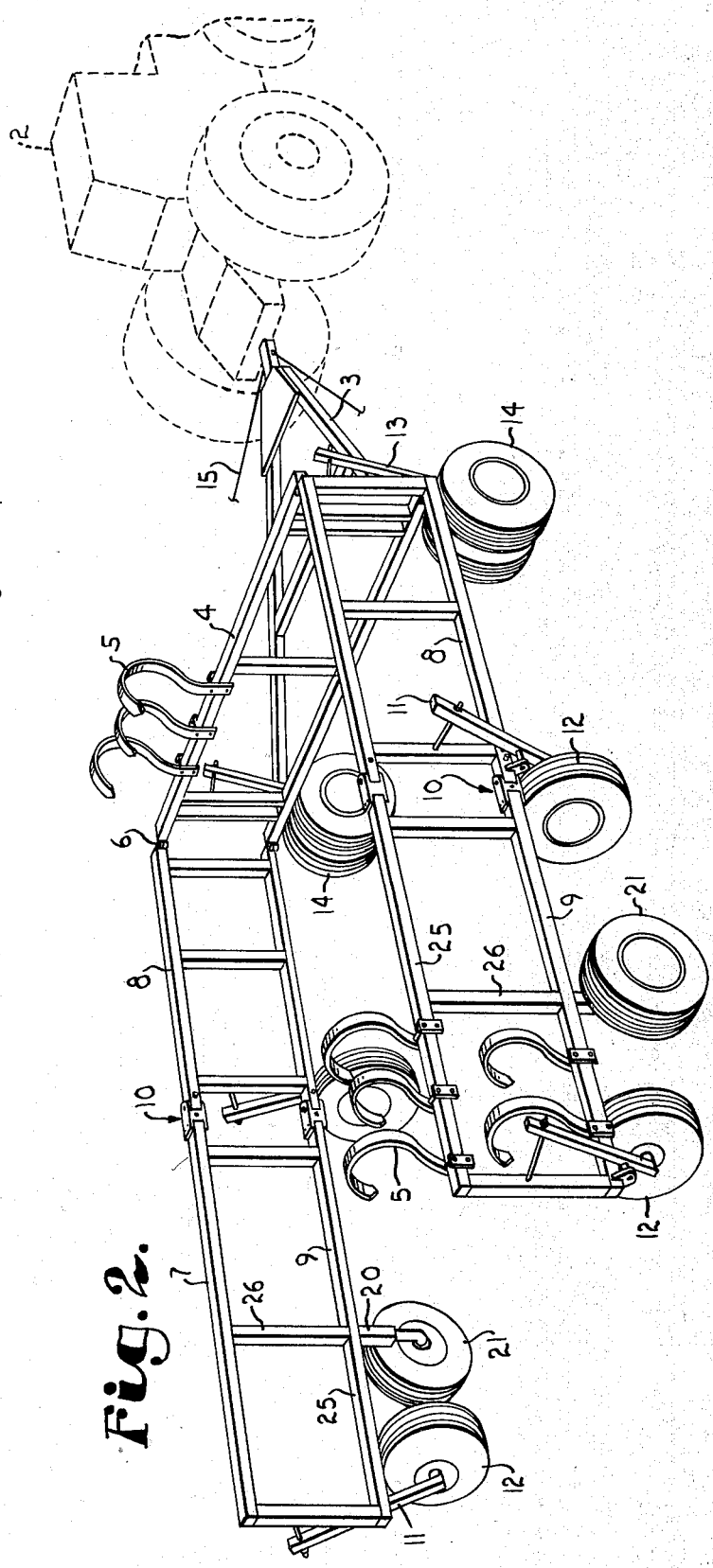

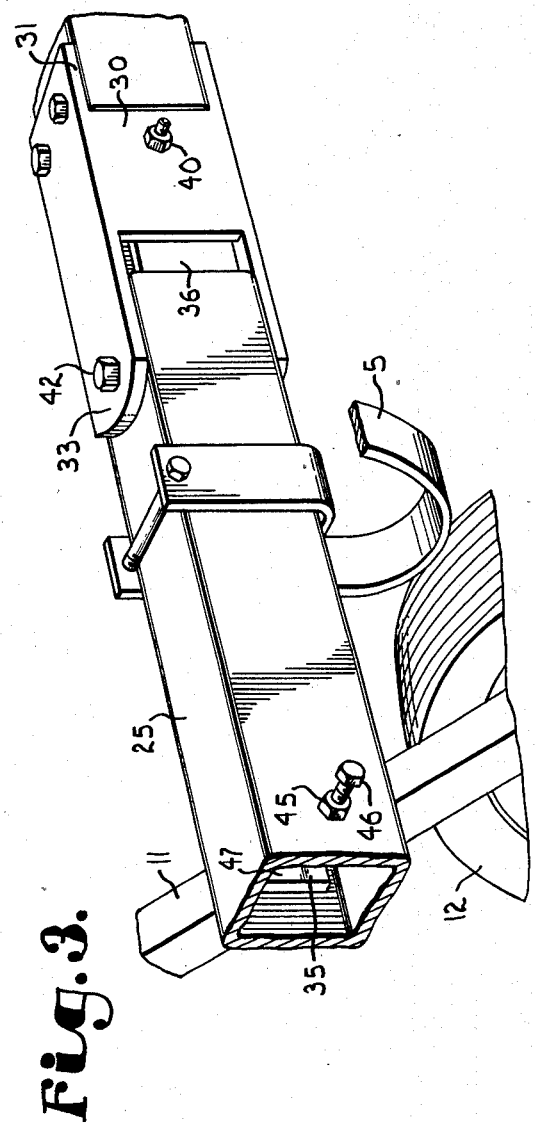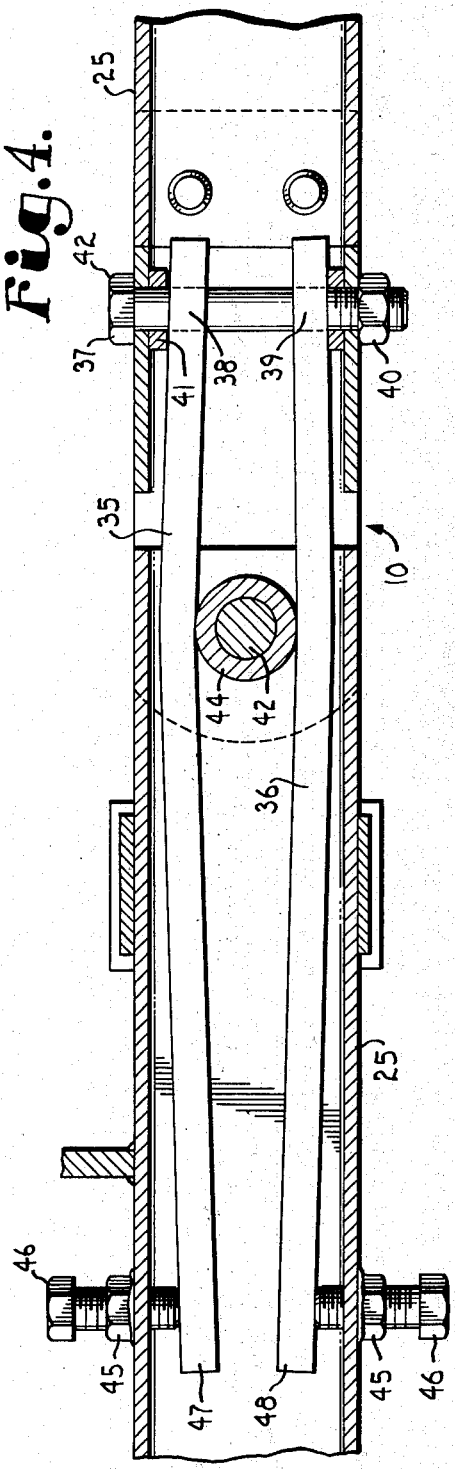

FOLDABLE FARM IMPLEMENT WITH TRAILING WING OSCILLATION RESTRICTOR

This invention relates to farm implements of the draft type having a central section and a pair of articulated wing sections which are movable from a laterally extended operating position to a trailing transport position, and more particularly, to an improved connection between portions of the wing section which functions to prevent excessive oscillation while trailing.

A need in agricultural operations is to have more efficient implements and economical means of cultivation. With the advent of more powerful tractors, a variety of commercially available multiple structure implements such as, for example, spring tooth cultivators or harrows have been manufactured. These implements often include a central tool carrying section and a pair of articulated tool carrying wing sections hingedly connected to the ends of the central section for confirmation to the underlying terrain. The wing sections increase the width of the swath covered in a single traverse of the field.

It is often difficult to move such an implement through fence gates or along roads or highways due to the great width in the extended position. Because of this, most such implements provide a lifting arrangement which cooperates with a hinge connector between the central section and wing sections to induce rotation from a horizontal to a vertical plane along an axis perpendicular to the longitudinal axis of the implement. When in this position a forward movement of the cart results in the wing sections folding behind the cart or central section and assuming a position generally parallel to the direction of travel. The central section is of an appropriately narrow width to pass through gate openings or along roads and highways and the trailing wings do not add significantly to this width.

While trailing, the articulated wings tend to oscillate violently, posing a danger to stationary objects, such as fence posts, and personnel. To avoid this, it has been suggested that the wing sections be locked into a rigid configuration, for example, see U.S. Pat. No. 3,841,412. However, such arrangements have required that the tractor operator leave the tractor to movably operate the locks, and during trailing, excessive strains were applied to the structure, occasionally causing damage thereto. This invention avoids the noted difficulties by providing a unique connector between the wing sections which permits normal articulation in the operating position but substantially dampens oscillation in the trailing position without manual actuation or deactuation.

The principal objects of the present invention are: to provide a spring loaded hinge mechanism between implement wing sections operable to resiliently inhibit oscillations thereof during trailing in the transport position; to provide a substantial reduction in the amount of time necessary to arrange the mechanism for transport; to provide a safer environment for the implement operator and users of roads and highways; to provide an increased operating life for the farm implement; to provide a reduction in strain loads upon the frame thereby reducing the tendency to warp and fracture; and to provide such an arrangement which is economical and well suited for its intended purpose. Other objects and advantages of this invention will become apparent from the following description taken in connection with the accompanying drawings wherein are set forth by illustration and example certain embodiments of this invention.

FIG. 1 is a rear elevational view of an implement embodying this invention with tool supporting sections in an operating position.

FIG. 2 is a perspective view of the implement with wing sections trailing in a transport position.

FIG. 3 is a fragmentary perspective view of the oscillation restricting mechanism.

FIG. 4 is a fragmentary sectional plan view on an enlarged scale showing details of the oscillation restricting mechanism.

An example of an implement embodying the present invention is illustrated generally in FIGS. 1 and 2 by the reference numeral 1 as pulled by a tractor 2 shown by dotted lines. As best seen in FIG. 1 the implement includes a conventional triangular draw bar 3 connected at the rear thereof to a central implement supporting section 4 which is mounted for powered movement with respect to the draw bar 3 about a horizontal transverse axis by conventional means (not shown). FIGS. 1 and 2, respectively, illustrate the central section 4 in a horizontal position for normal operation and in a vertical position for transport. The width of the central section 4 is dictated by practical considerations such as the overall width of the tractor, the roadway, gates, etc. Tillage tools 5 are mounted on the central section 4 to engage the ground when in the operative position.

Hinges 6 connect each end of the central section 4 to the inner ends of tillage tool carrying wing sections 7. In this embodiment each of the wing sections 7 is formed of a pair of frames. The inner frame of each pair being designated 8 and the outer frame 9. An oscillation restricting mechanism, generally designated 10, connects the inner frame 8 and the outer frame 9.

The outer ends of frames 8 and 9 include forwardly projecting arms 11 to which journal wheels 12 are attached. Similar arms 13, attached to the central section 4, support journal wheels 14 as is best seen in FIGS. 1 and 2. The wheels 12 and 14 support the implement, including the central section 4 and the wing sections 7, when the sections are in the operative position.

Cables 15 extend from the tractor hitch portion of the draw bar 3 to the outer frames 9 and provide support for said frames in the operative position. The cables 15 have a suitable release mechanism (not shown) which permits folding of the wing sections for transport.

In FIG. 2 it may be seen that each of the outboard frames 9, near the outboard end, has a forwardly projecting wheel mount 20 which supports a journal wheel 21. The arrangement is such that journal wheel 21 is in a lower extended position than the adjacent journal wheel 12 when the wings are in a transport position whereby the wheels 21 will engage the ground and elevate the wheels 12 out of ground contact. In the transport position the implement is supported by journal wheels 14 and 21, FIG. 2.

In the representation of FIG. 2 horizontal hollow strictural members 25 are connected together in spaced, parallel relation by structural cross members 26 forming the structure of the wing frames 8 and 9. The oscillation restricting mechanism 10 is connected to adjacent ends of horizontal members 25 and functions to urge the frame pairs 8 and 9 to an in-line position.

In FIGS. 3 and 4 the oscillation restriction mechanism 10 is illustrated in greater detail and includes a support body 30, 31, 32 and 33, 34 consisting, for example, of a 3/16th inch wall thickness, 3 × 3 inches square tube with pairs of spaced ears projecting from the ends. A spring or resilient member, here in the form of a pair of leaf springs 35 and 36, extends longitudinally within the body 30 and a horizontal member 25. A retaining bolt 37 extends through the support body 30 and ends 38 and 39 of the leaf springs to limit relative longitudinal movement. In this embodiment retaining bolt 37 receives nut 40 for retention. One-quarter inch by one inch flat ring spacers 41 surround the retaining bolt 37 and function to urge the leaf spring ends 38 and 39 slightly inwardly from the side walls of the support body 30.

The ears 33 and 34, in this example, extend over opposed sides of the adjacent member 25 and form a hinge arrangement therewith by means of connection with a hinge pin or bolt 42 and cylindrical bearing tube 44 which extend therethrough. The leaf springs 35 and 36 contact the bearing tube 44 on opposed sides thereof and intermediate the ends of said leaf springs. Nuts 45 are welded to opposed sides of the hinge body and form threads for set screws 46 which project into the member interior perpendicular to the leaf springs 35 and 36 near the ends 47 and 48 thereof. The set screws 46 engage the ends 47 and 48 and function to selectively increase or decrease the loading thereon and thereby provide for a variance in hinge rigidity as desired.

The hinge bolt 42 and bearing tube 44 perform multiple functions. They provide a connection between the body 30 and adjacent member 25, form the pivot base about which the hinge functions and act as fulcrum points for the leaf springs to act as levers.

In operation, the mechanisms 10, when properly adjusted, permits normal wing frame articulation during tillage runs. For transport, the implement is pivoted upwardly, permitting the wing sections to fold to a position parallel to the direction of transport, whereupon, without actuation, the mechanisms 10 function to restrict the oscillation of the wings, which would otherwise occur.

It is to be understood that, while certain forms of this invention have been illustrated and described, it is not to be limited thereto, except insofar as such limitations are included in the following claims.

What is claimed and desire to secure by Letters Patent is:

1. A farm implement of the foldable tow type comprising:
   a. a wheeled center section supporting tillage tools and pivotable about a transverse axis between a generally horizontal operational position and a generally vertical transport position;
   b. a pair of wheeled wing sections supporting tillage tools and respectively positioned at opposite ends of said central section, hinges connecting each of said wing sections to said central section whereby said wing sections are movable with said central section between said positions;
   c. said wing sections each comprising at least two rigid frames positioned end-to-end;
   d. means connecting said frames for flexible movement of one frame relative to the adjacent frame permitting, in the said operational position, relative flexing for conforming to the contour of the underlying terrain;
   e. said means comprising a resilient member connected between said pair of frames and operable to urge said frames toward an in-line relation, whereby upon attaining a trailing position the tendency of said frames to oscillate during transport is minimized;
   f. said means connecting said frames comprising a hollow housing and said resilient member extends within said housing;
   g. said housing having spaced ears respectively projecting over one end of one said frames; and
   h. a hinge pin extending through said ears and said frame end.

2. An implement as set forth in claim 1 wherein:
   a. said connecting means comprises a pair of oppositely loaded leaf springs.

3. An implement as set forth in claim 1 wherein:
   a. said resilient member comprises a normally substantially linear spring member positioned for bending transversely to the longitudinal axis thereof.

4. A farm implement of the foldable tow type comprising:
   a. a wheeled center section supporting tillage tools and pivotable about a transverse axis between a generally horizontal operational position and a generally vertical transport position;
   b. a pair of wheeled wing sections supporting tillage tools and respectively positioned at opposite ends of said central section, hinges connecting each of said wing sections to said central section whereby said wing sections are movable with said central section between said positions;
   c. said wing sections each comprising at least two rigid frames positioned end-to-end;
   d. means connecting said frames for flexible movement of one frame relative to the adjacent frame permitting, in the said operational position, relative flexing for conforming to the contour of the underlying terrain;
   e. said means comprising a pair of oppositely loaded leaf springs connected between said pair of frames and operable to urge said frames toward an in-line relation, whereby upon attaining a trailing position the tendency of said frames to oscillate during transport is minimized.

5. An implement as set forth in claim 4 wherein:
   a. at least one of said frames adjacent said frame connecting means is comprised of hollow beams; and
   b. said leaf springs extend longitudinally within said beam.

6. An implement as set forth in claim 4 wherein:
   a. said means includes a hinge assembly which assembly includes a hinge pin.

7. An implement as set forth in claim 4 wherein:
   a. said means includes opposing set screws contacting said leaf springs and urging the same toward each other.

8. An implement as set forth in claim 5 wherein:
   a. said frames include interconnected beams;
   b. one of said beams has spaced ears respectively projecting over one end of one of said frames; and
   c. a hinge pin extends through said ears and said frame end.

9. An implement as set forth in claim 4 wherein:

a. said frames adjacent said frame connecting means are comprised of hollow beams;
b. said leaf springs extend within said hollow beams;
c. one of said beams has spaced ears respectively projecting over one end of one of said frames;
d. a hinge pin extends through said ears and said frame end;
e. said leaf springs are positioned on opposite sides of said hinge pin; and
f. said frame connecting means includes opposed set screws contacting said leaf springs and urging the same toward each other.

10. A farm implement of the foldable tow type comprising:
a. a wheeled center section supporting tillage tools and pivotable about a transverse axis between a generally horizontal operational position and a generally vertical transport position;
b. a pair of wheeled wing sections supporting tillage tools and respectively positioned at opposite ends of said central section, hinges connecting each of said wing sections to said central section whereby said wing sections are movable with said central section between said positions;
c. said wing sections each comprising at least two rigid frames positioned end-to-end;
d. means connecting said frames for flexible movement of one frame relative to the adjacent frame permitting, in the said operational position, relative flexing conforming to the contour of the underlying terrain;
e. said means comprising a hinge assembly, which assembly includes a hinge pin and a pair of elongated leaf springs positioned on opposite sides of said hinge pin and connected between said pair of frames and operable to urge said frames toward an in-line relation, and opposed set screws associated with said frames, said set screws contacting said leaf springs and urging same toward each other, whereby upon attaining a trailing position the tendency of said frames to oscillate during transport is minimized.

* * * * *